Oct. 7, 1958
H. F. FRUTH
2,854,796
APPARATUS FOR MAKING CAPACITORS
Filed June 13, 1955
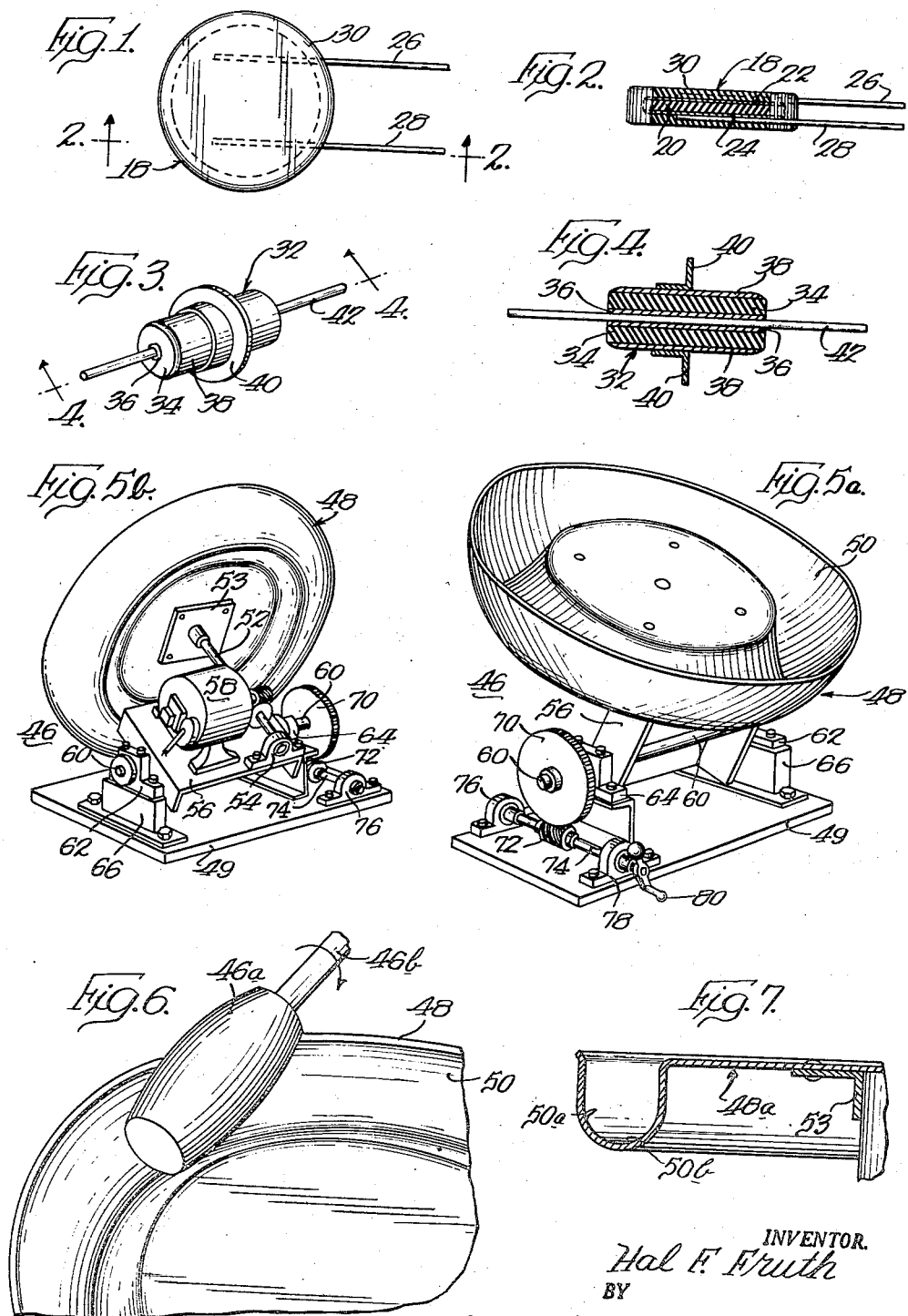
INVENTOR.
Hal F. Fruth
BY
Mason, Kolehmainen, Rathburn & Wyss
Attys United States Patent Office 2,854,796
Patented Oct. 7, 1958

2,854,796

APPARATUS FOR MAKING CAPACITORS

Hal F. Fruth, Skokie, Ill., assignor to Radio Kemetal Industries, Inc., Skokie, Ill., a corporation of Illinois Application June 13, 1955, Serial No. 514,990

4 Claims. (Cl. 51—73)

The present invention relates to improved apparatus for edge grinding small articles and, more particularly, to improved apparatus for mass producing small high quality capacitors of the type used in electronic circuits in an inexpensive and reliable manner. Copending application Serial No. 514,880, filed June 13, 1955, is directed to methods of manufacturing capacitors utilizing this apparatus.

One commercial capacitor of this type conventionally comprises a solid dielectric member having metallic surface portions thereon which are disjoined from one another. Generally such capacitors are either the disk type or the tubular type having capacitance values within the range of five to one-hundred thousand micromicrofarads. The disks and tubular type capacitors are basically quite similar in that a self-supporting dielectric base member, wafer-shaped in the case of the disk capacitors, and tube-shaped in the case of the tubular capacitors, is provided with metallic surface portions insulated from one another by the dielectric base member, thereby to establish a capacitance between the separated metallic surface portions.

In accordance with prior art practices, this type of capacitor is manufactured by painting or printing a conductive varnish or metal on separated portions of the surface of a dielectric base member. In the case of the disk capacitors, metallic spots are painted on the opposite sides of a dielectric wafer by a conventional printing process such, for example, as silk-screening. In the case of the tubular capacitors, a conductive paint is applied to the outer surface of the tube by rolling the tube on a painted surface and is applied to the inner surface of the tube by means of a paint coated rod which is inserted into the tube. In order to insure that the paint is properly applied to the inner wall of the tube, various techniques are resorted to such, for example, as providing the rod with barbs or other irregularities from which the conductive paint is flowed onto the inner surface of the dielectric tube.

It will thus be seen that in order to manufacture capacitors in accordance with prior art methods, each capacitor core must have the metallic surfaces individually painted thereon which, of course, means that mass production techniques become quite complicated. Moreover, in order to manufacture condensers having the same desired capacitance value with a tolerance variation of only a few percent from the desired value, it is necessary accurately to control the following factors: the areas of the painted surface portions of the cores, the dielectric constant of the core material and the thickness of the dielectric material. Actually, only disk type capacitors having accurately controlled capacitance values may be manufactured on a commercial basis using prior art methods. Additionally, in order to provide the maximum breakdown voltage rating for capacitors of a given physical size and capacitance value, the spacing between the metallic surfaces must be a maximum at all places. Therefore, the metallic spots on the base members of the capacitors must be accurately centered on the dielectric cores. This is difficult to achieve when using the methods of the prior art.

It is an object of this invention, therefore, to provide improved slide tumbling apparatus for making capacitors of both disk and tubular types.

Another object of the invention is to provide improved apparatus for edge grinding small articles, such as dielectric core type capacitors, in batches.

Still another object of the present invention is to provide improved apparatus for slide-tumbling small articles, such as capacitors, in batches.

A further object of the present invention is to provide improved slide-tumbling apparatus for facilitating the removal of portions of a metallic layer from a metal clad dielectric core to separate portions of the metallic layer so as to effect a capacitor.

Briefly, the above objects are realized in accordance with the present invention by providing an article support member having an annular trough which is adapted to be rotated about an axis inclined from the horizontal. The trough is substantially semi-toroidal so that when the articles and an abrasive are placed in the trough, rotation thereof causes the edges of the articles to be ground away.

The invention, both as to its organization and method of operation, together with further objects and advantages thereof, will best be understood by reference to the following detailed description taken in connection with the accompanying drawings in which:

Fig. 1 is a plan view of a disk type capacitor of the type which may be manufactured in accordance with the present invention;

Fig. 2 is a partial sectional view of the capacitor of Fig. 1 taken along the line 2—2 thereof;

Fig. 3 is a perspective view of a tubular capacitor of the type which may be manufactured in accordance with the present invention;

Fig. 4 is a sectional view of the tubular capacitor of Fig. 3 taken along the line 4—4 thereof;

Fig. 5a is a front perspective view of slide-tumbling apparatus embodying certain aspects of the present invention;

Fig. 5b is a back perspective view of the slide-tumbling apparatus shown in Fig. 5a;

Fig. 6 is a fragmentary sectional view of a modified embodiment of the apparatus shown in Figs. 5a and 5b; and Fig. 7 is a fragmentary perspective view of another aspect of the invention as embodied in slide-tumbling apparatus.

Referring now to the drawings and, more particularly to Figs. 1 and 2 thereof, there is shown a disk-type capacitor 18 having a wafer-like self-supporting base or core portion 20 constructed of a solid dielectric material, such as, for example, a ceramic material. The plates of the capacitor 18 consist of two metallic layers 22 and 24, which are provided on the opposite flat surfaces of the dielectric member 20, with the edges of the dielectric member 20 being free from conductive material. Thus the plates 22 and 24 are separated by the dielectric material and have a capacitance therebetween which is dependent upon the areas of the plates and the thickness and dielectric constant of the base member 20. In order to connect the capacitor 18 into an electric circuit, a pair of lead wires 26 and 28 are respectively attached, as by soldering, to the plates 22 and 24 and extend outwardly a considerable distance therefrom. Short circuiting of the plates 22 and 24 to other parts of the electric circuit in which the capacitor 18 is connected is prevented by covering the composite disk with an insulating housing 30.

In the tubular type capacitor 32 shown in Figs. 3 and 4, the capacitor comprises a tube-shaped body or core portion 34, constructed of a dielectric material, which supports and separates the capacitor plates 36 and 38. These plates are provided on the inner and outer walls of the core portion 34. The ends of the tubular member 34 are left free from conductive material. Thus the plates 36 and 38 are separated by the dielectric therebetween and have a capacitance value which is dependent upon the surface area of the plates 36 and 38, the thickness of the dielectric member 34 and the dielectric constant thereof. The tubular type capacitor 32 is generally employed where one terminal thereof is to be connected to a chassis, and to facilitate such a connection, a conductive eyelet 40 having an inner diameter approximating the outer diameter of the metal clad tubular member 34 is soldered to the outer plate 38 intermediate the ends of the tube 34. Furthermore, to facilitate the making of electrical connections to the inner plate 36 from either the top or the bottom of the chassis, a single conductive wire 42 is inserted through the bore of the tubular member 34 and is soldered to the inner plate 36 so that the outer ends of the lead 42 extend from opposite ends of the tube 34.

Referring now, more particularly, to Figs. 5a and 5b, there is shown a preferred embodiment of the present improved edge grinding machine, generally indicated at 46, for edge grinding metallized capacitor cores of the disk type or metallized capacitor cores of the tubular type. In brief, this machine comprises an annulus 48 which is arranged for rotation about the principal axis thereof, this axis being adjustably inclined with respect to a horizontal plane in which is located the support bed 49 of the machine 46. Considered more in detail, the annulus 48 is conveniently formed of aluminum and defines a semi-toroidal shaped trough 50 in which the metallized capacitor cores are placed for edge grinding.

A shaft 52, extending along the principal axis of the annulus 48, is suitably attached at one end to the bottom of the annulus 48 by means of a face member 53 which is bolted to the annulus 48 in the manner illustrated. The shaft 52 is journaled in a plurality of bearing blocks 54 which are mounted upon a channeled base plate 56 and is connected to be driven by an electric motor 58, which is also mounted on the plate 56.

In order to provide for manual adjustment of the angle of inclination of the annulus 48 with respect to the horizontal plane of the bed 49, the base plate 56 is fixedly mounted upon a shaft 60 which is pivotally supported at its ends by a pair of bearing blocks 62 and 64. These blocks are mounted in elevated positions above the bed 49 on a pair of brackets 66 and 68. A worm gear 70 is fixedly attached to a projecting end portion of the shaft 60 and is adapted to be rotated by a worm 72 which is fixedly mounted upon a rotatable shaft 74 intermediate the ends thereof. The shaft 74 is journaled in bearing blocks 76 and 78 at the respective ends thereof and an operating handle 80 is secured to the shaft 74 near one end thereof. With the described mechanism, the angle of inclination of the annulus 48 may readily be adjusted by rotating the handle 80 to drive the shafts 74 and 60 and thus tilt the annulus 48 in the desired direction. The drive mechanism is automatically locked in the selected position by the worm drive facilities included in the mechanism.

In utilizing the described apparatus 46 for slide-tumbling metallized capacitor disks to remove the metallic edges therefrom, the metallic coated cores are placed in the trough 50 together with an abrasive material, such, for example, as Carborundum. In addition, a liquid such as water is placed in the trough 50 to prevent the accumulation of metallic particles on the surfaces of the metallized capacitor disks which are to be edge ground. Ordinarily, about six thousand disks are placed in the machine 46 at one time and the annulus 48 is rotated at between twenty and forty revolutions per minute while being maintained at a thirty to fifty degree angle of inclination with the horizontal bed 46. Although the surface of the trough 50 may be charged with the abrasive material before being filled with the disks, it is desirable to charge the trough 50 with the abrasive at the same time it is filled with the disks.

During rotation of the annulus 48, the disks accumulate and tend to stay at the lower end of the trough 50 due to the gravitational forces acting thereon, and move in random fashion against the charged surface of the trough, which, being continuously curved, is contacted only by the edges of the disks as they ride therein so that only that metal which is located in the vicinity of the edges of the disks is removed. The random sliding of the disks on the bottom of the trough 50 thus tapers the edges of the disks, the degree of taper being dependent upon the ratio of the width of the trough 50 to the diameter of the disks, and it may be seen that the greater this ratio the greater will be the angle of taper, and hence the smaller the metallic face surface area that will remain after a given amount of grinding.

Since the amount of tumbling in the trough 50 is determinative of the area of the metallic surfaces remaining on the faces of the disks, the slide-tumbling machine 46, in addition to removing the edge metal may conveniently be used accurately to adjust the capacitance of the disks to a desired value by changing the surface area of the metallic layer which is present on the faces thereof. In order to conserve the amount of dielectric material used in each capacitor and to minimize the time of the tumbling operation, the width of the trough 50 and the diameter of the disks should be selected so that the maximum angle of taper commensurate with the desired breakdown voltage rating is obtained. In this connection it has been found that for a disk of given diameter and a predetermined tumbling period, the capacitance varies inversely with the width of the trough 50. It has also been found that under normal factory conditions ninety percent of a large batch of capacitors may be adjusted to within ±5% of a desired capacitance value by slide-tumbling in the machine 46, and with controlled conditions the tolerance can be reduced to less than ±2% of the desired capacitance value.

In order to adjust the capacitance value of capacitors of the tubular type, the metal clad dielectric tubes are placed in the trough 50 in the same manner as in the case of the disk type, and the machine 46 is operated in exactly the same manner. In the case of the tubular capacitors, the outer edges are chamfered by the sliding movement thereof on the surface of the trough 50, thereby to reduce the outer metallic surface area to such a value as to effect the desired capacitance value.

Although other methods may be employed for initially removing the short circuiting end metal from the metallized dielectric members of either the disk type or the tubular type, the described slide-tumbling step must be performed in order to bring the capacitances of the metallized dielectric members to the desired uniform value. In the case of tubular capacitors, the removal of the short circuiting end metal and the grinding of the capacitors to the desired capacitance value may be accomplished simultaneously in one operation irrespective of the voltage rating and capacitance value of the capacitors being made. In the case of the disk capacitors, however, a metallic band remains around the ends of the disks after they have been ground to the desired capacitance value, unless a low trough width to disk diameter ratio is used during the tumbling operation, or unless the tumbling time is excessively long. This band is especially undesirable in many cases since it materially reduces the voltage rating of the capacitor. Of course, if the thickness of each of the disks is to be small as compared with the metallized face size of the disks, this metallic band will be removed while grinding the disks to the desired capacitance. In the interests of minimizing grinding time and conserving the amount of dielectric material used in making each capacitor, efficient utilization of disk surface area is demanded. This dictates in most instances that the end metal be removed from the disk capacitors in an operation separate from that of grinding the capacitors to the desired capacitance value.

In order to efficiently remove the end metal from the metallized disks, an annulus 48 having a trough 50 with a width approximating the diameter of the disk to be end ground may suitably be employed. To prevent the disks from becoming wedged in the trough 50, the trough width should exceed the disk diameter by approximately ten percent or more. Preferably, the end metal removal operation is performed before the operation of grinding the disks to the desired capacitance value, so that the desired capacitance is more accurately obtained in the finished capacitors. However, the sequence of operations may be reversed if desired.

In the modified embodiment of the annulus shown in Fig. 7, grinding of the metallized disks to remove the edge metal and to establish the desired capacitance value may be performed in one operation. To this end the annulus 48a is formed to define a trough having a semi-toroidal bottom portion 50b and flat upper wall portions 50a whereby, as the disks move in random fashion in the bottom portion 50b of the trough 48a, the edges are tapered in the manner heretofore described, and when the disks move in and contact at random the upper wall portions 50a of the trough 48a, there is a tendency for the ends of the disks to slide along the flat surface 50a and, therefore, the end metal is removed to a greater extent than in the case of the continuously curved trough 50. Thus the described modified annulus may be used to effect simultaneous removal of all of the end metal from the disks and grinding of the disks to the desired capacitance value.

In order to reduce the tumbling time required to grind either the disk or tubular capacitors to the desired capacitance value in the tumbling machine 46, an external force may be applied to force the disks against the charged sides of the trough. Referring to Fig. 6, apparatus is thereshown for supplying such a force. Briefly, this apparatus comprises a weighted member 46a fixedly located at such a position as to extend within the trough 50 to press the capacitors, either disk or tubular, against the walls of the trough as they pass by the member 46a. In order to minimize the piling up of the capacitors against the member 46a as they are moved thereagainst during rotation of the trough 50, it is desirable to rotate the member 46a. To this end the member 46a is mounted on a rotatable shaft 46b which is driven by a motor (not shown). Also, it has been found that a generally cylindrical member 46a having tapered ends and constructed of a resilient material, such as rubber, operates most satisfactorily in grinding both the disk and tubular types of capacitors. The weighted member 46a may be used with the modified annulus of Fig. 7, thereby to enable the use of a relatively narrow trough 50 without the capacitors becoming jammed therein.

Should it be desirable to rotate the annulus 48 in a vertical plane, the lip of the trough 50 may be curved inwardly to maintain the capacitors within the trough 50.

In order to accommodate a large number of capacitors in such a trough at one time the inwardly curved portion may be of considerable length whereby the trough 48 resembles an automobile tire.

While there have been described what is at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. Apparatus for removing the edge metal from metal coated dielectric base members and for adjusting the capacitance value between the metal surfaces left on said base members when said edge metal has been removed, said apparatus comprising an annular trough having a concave bottom surface, the radius of curvature of said surface being many times greater than the longest dimension of said metal coated base members, said surface being of an abrasive nature whereby the bottom surface of said trough constitutes a grinding area, the radius of curvature of the annulus defined by said trough being many times greater than the radius of curvature of said concave surface whereby a sufficient number of said metal coated base members may be supported in said trough to insure tumbling of said members upon rotation of said annular trough about the principal axis thereof, means for rotating said trough with said axis displaced at a substantial angle with respect to the horizontal so that said metal coated base members when disposed in said groove are urged by the force of gravity into engagement with said concave bottom surface, the angle of inclination of said principal axis with respect to the vertical and the speed of rotation of said trough about said axis being such that when a sufficient number of said base members are positioned in said trough the rotation thereof causes said base members to tumble in said trough thereby to have the edge metal removed therefrom and to have the size of the disconnected metal layers thereon adjusted to provide a desired value of capacitance between said layers.

2. Apparatus as set forth in claim 1 which further includes means for adjusting said angle of inclination of said trough to permit the pouring of said members out of said trough after they have been tumbled.

3. Apparatus as set forth in claim 1 wherein the side walls of said trough include upper portions which are parallel to the axis of rotation of said trough.

4. Apparatus as set forth in claim 1 which further includes weighted means detached from said trough and biased against a small portion of said bottom surface, and means for rotating said weighted means about an axis which is substantially tangential to said groove.

References Cited in the file of this patent

UNITED STATES PATENTS

| | | |
|---|---|---|
| 760,664 | Valk | May 24, 1904 |
| 1,360,511 | Emerson | Nov. 30, 1920 |
| 2,199,707 | Mandle | May 7, 1940 |
| 2,387,136 | Fruth | Oct. 16, 1945 |
| 2,391,634 | Lewis | Dec. 25, 1945 |
| 2,450,606 | Molitor | Oct. 5, 1948 |
| 2,664,676 | Cuppers | Jan. 5, 1954 |